US010071268B2

(12) United States Patent
Gaines et al.

(10) Patent No.: US 10,071,268 B2
(45) Date of Patent: Sep. 11, 2018

(54) ROOF-MOUNTED FALL-ARREST SAFETY DEVICE

(71) Applicant: Vince J. Gaines, Woodstock, GA (US)

(72) Inventors: Vince J. Gaines, Woodstock, GA (US); Steven M. Frank, Suwanee, GA (US)

(73) Assignee: Vince Gaines, Woodstock, GA (US)

( * ) Notice: Subject to any disclaimer, the term of this patent is extended or adjusted under 35 U.S.C. 154(b) by 13 days.

(21) Appl. No.: 15/452,837

(22) Filed: Mar. 8, 2017

(65) Prior Publication Data

US 2017/0259090 A1    Sep. 14, 2017

Related U.S. Application Data

(60) Provisional application No. 62/305,124, filed on Mar. 8, 2016.

(51) Int. Cl.
*A62B 35/00* (2006.01)
*F16M 13/02* (2006.01)
(Continued)

(52) U.S. Cl.
CPC ....... *A62B 35/0068* (2013.01); *F16M 13/022* (2013.01); *E04D 13/00* (2013.01); *E04G 3/26* (2013.01)

(58) Field of Classification Search
CPC ......... A62B 35/0069; A62B 1/08; A62B 1/10; A62B 1/12; A62B 35/0093; A62B 35/00;
(Continued)

(56) References Cited

U.S. PATENT DOCUMENTS 72,762 A * 12/1867 Taft ........................... E04G 3/26
                                                                    182/45
84,595 A * 12/1868 Van Doren ............... E04G 3/26
                                                                    182/45
(Continued)

FOREIGN PATENT DOCUMENTS

KR    1020130012532    2/2013
SU            10750    7/1929

OTHER PUBLICATIONS

International Search Report and Written Opinion; dated Jul. 6, 2017; For PCT/US2017/021296; 7 pages.
(Continued)

*Primary Examiner* — Nkeisha Smith
(74) *Attorney, Agent, or Firm* — Gardner Groff Greenwald & Villanueva, PC

(57) ABSTRACT

A frame, one or more wheels rotationally attached to the frame, two or more end feet attached to opposite ends of the frame, one or more end safety tether attachments, and a flip-pole attachment. The frame straddles the roof peak so the end feet are stably positioned on opposite roof surfaces. The wheels enable the device, when flipped to its inverted position, to be rolled up and down the roof for installation and removal. The flip-pole attachment enables attachment of a flip pole for use in installing and removing the device from a ladder. And the end tether attachments enable workers to couple their safety tethers to the secured device so that if they fall their fall will be arrested for safety. In typical embodiments, an outrigger assembly is included with peak-mounting side feet for nesting on the roof peak and with side tether attachments for side attachment.

20 Claims, 11 Drawing Sheets

(51) Int. Cl.
*E04G 3/26* (2006.01)
*E04D 13/00* (2006.01)

(58) Field of Classification Search
CPC ............ A62B 35/0043; A62B 35/0075; A62B 35/0006; A62B 35/005; A62B 35/0025; F16M 13/022; E04D 13/00; E04G 3/26; E04G 3/265; E04G 21/328; E06C 7/488
USPC .................. 248/237, 148, 536, 48.1, 332
See application file for complete search history.

(56) References Cited

U.S. PATENT DOCUMENTS

| | | | | |
|---|---|---|---|---|
| 2,597,902 | A * | 5/1952 | Roketa | E06C 7/48 |
| | | | | 182/214 |
| 2,733,031 | A * | 1/1956 | Morgillo | H01Q 1/1221 |
| | | | | 248/316.6 |
| 4,249,713 | A | 2/1981 | Glynn et al. | |
| 5,054,576 | A * | 10/1991 | Glynn | A62B 35/04 |
| | | | | 182/3 |
| 5,211,411 | A * | 5/1993 | Oleksiuk | B62B 5/04 |
| | | | | 182/45 |
| 5,320,194 | A * | 6/1994 | Bredijk | E04D 15/02 |
| | | | | 182/142 |
| 6,003,629 | A * | 12/1999 | Cloutier | E04G 3/26 |
| | | | | 182/113 |
| 6,092,624 | A * | 7/2000 | Slater | E04D 15/00 |
| | | | | 182/206 |
| 6,681,893 | B1 * | 1/2004 | Coulson | E04D 15/00 |
| | | | | 182/107 |
| 7,028,809 | B2 * | 4/2006 | Dudschus | E06C 1/345 |
| | | | | 182/107 |
| 8,857,568 | B2 * | 10/2014 | Foster, Sr. | E06C 1/10 |
| | | | | 182/45 |
| D729,985 | S | 5/2015 | Strawder | |
| 9,186,529 | B2 * | 11/2015 | Correia | A62B 35/0068 |
| 9,273,515 | B2 * | 3/2016 | O'Grady, Sr. | E04G 3/265 |
| 9,308,403 | B2 * | 4/2016 | Strawder | A62B 35/0068 |
| 9,551,184 | B2 * | 1/2017 | Webster | E06C 1/10 |
| 9,611,665 | B2 * | 4/2017 | West | E04G 21/3276 |
| 2011/0048851 | A1 * | 3/2011 | Koneval | E04G 21/3261 |
| | | | | 182/3 |
| 2014/0008150 | A1 * | 1/2014 | Baglin | E06C 1/345 |
| | | | | 182/129 |
| 2017/0225017 | A1 * | 8/2017 | Johanneck | A62B 35/0068 |
| 2017/0232280 | A1 * | 8/2017 | Carroccia | A62B 35/0006 |
| | | | | 182/3 |

OTHER PUBLICATIONS

The Goat Steep Assist, Retrieved Jan. 27, 2016, 3 pages.
The Ridgepro, <www.theridgepro.com>, Retrieved Jan. 27, 2016, 3 pages.

* cited by examiner

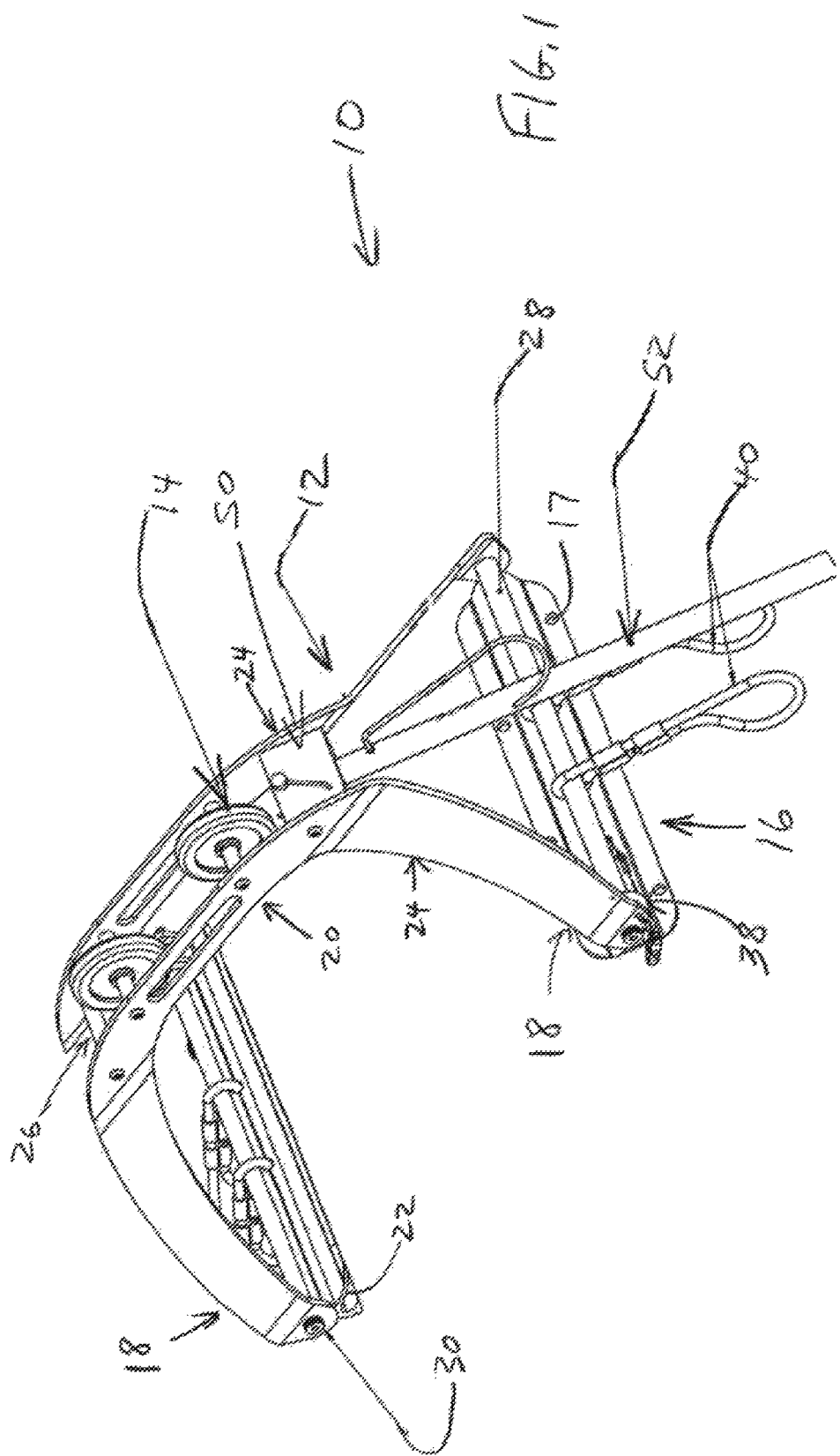

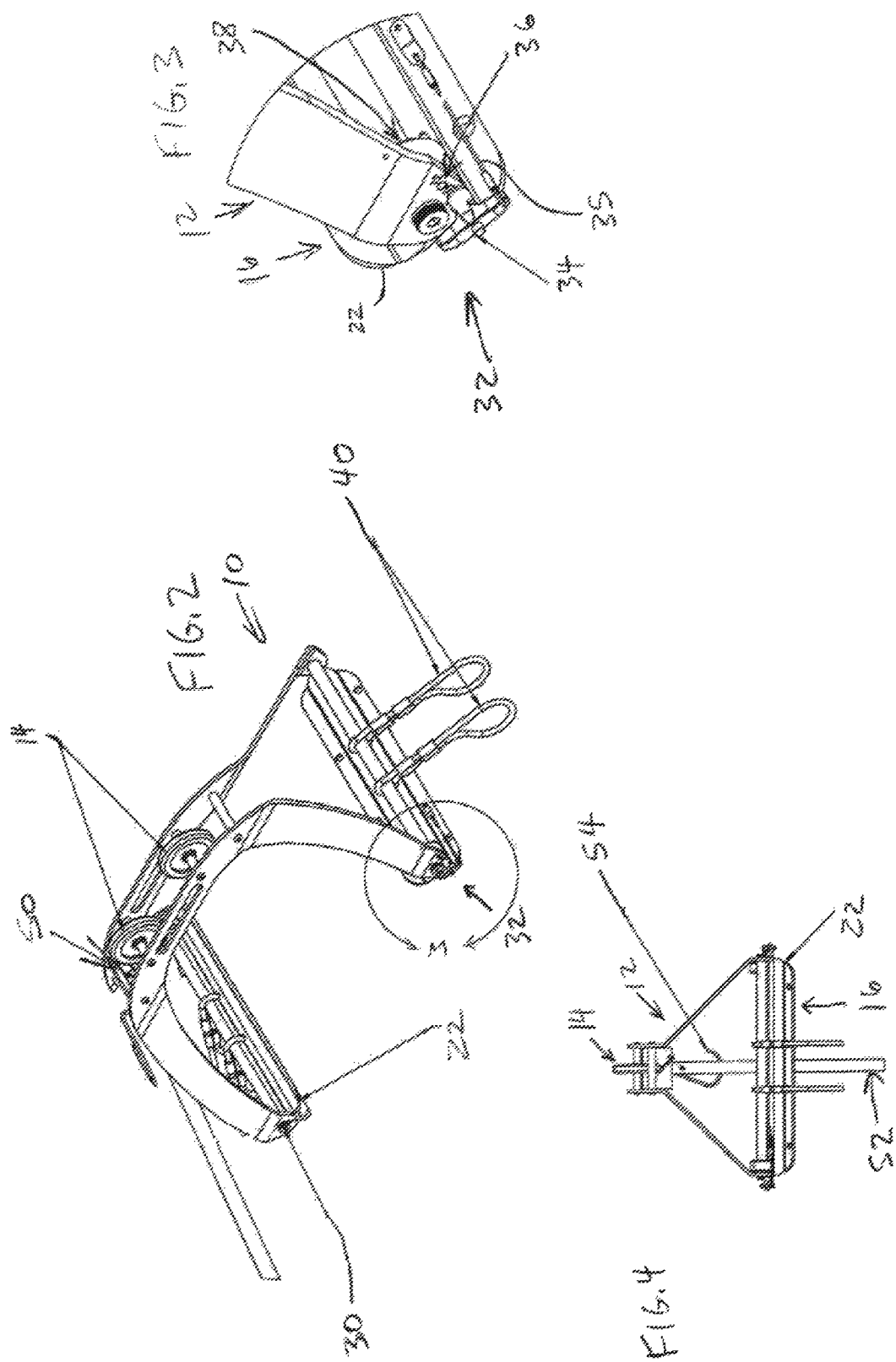

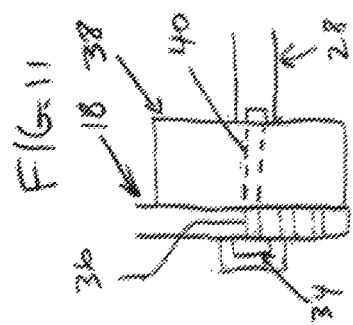
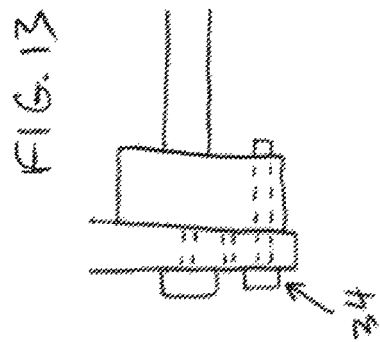
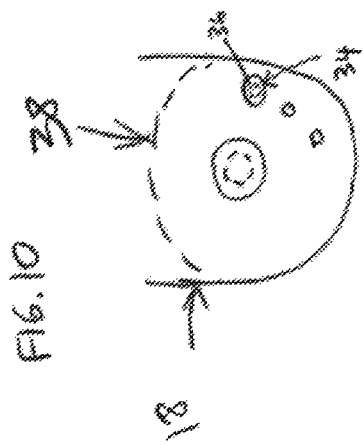
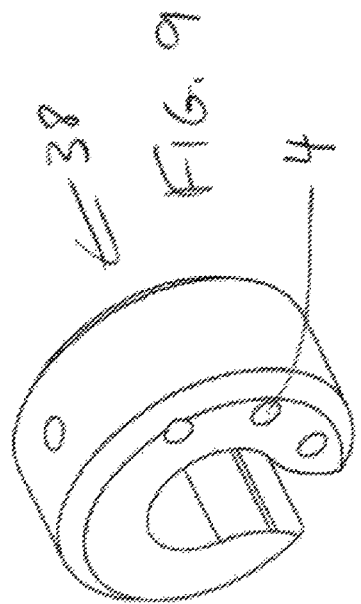

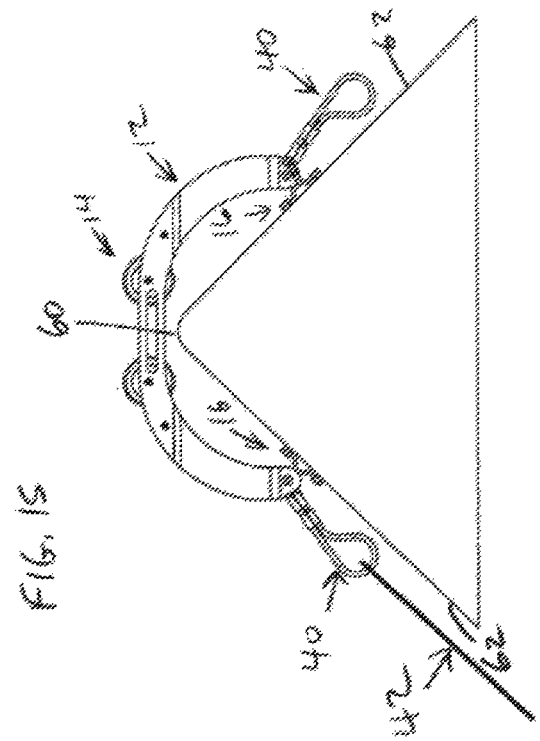
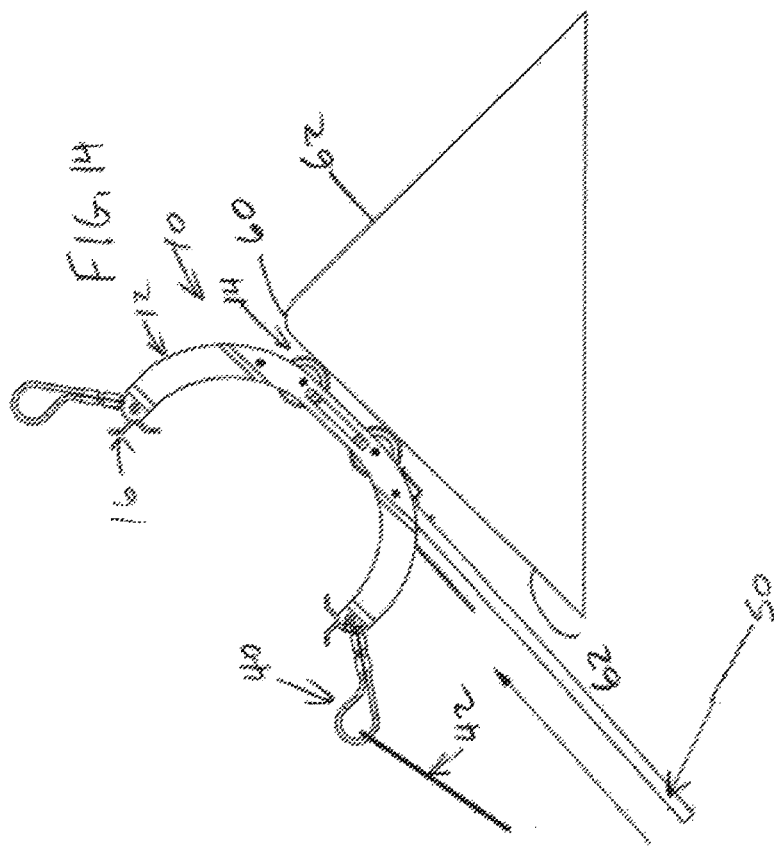

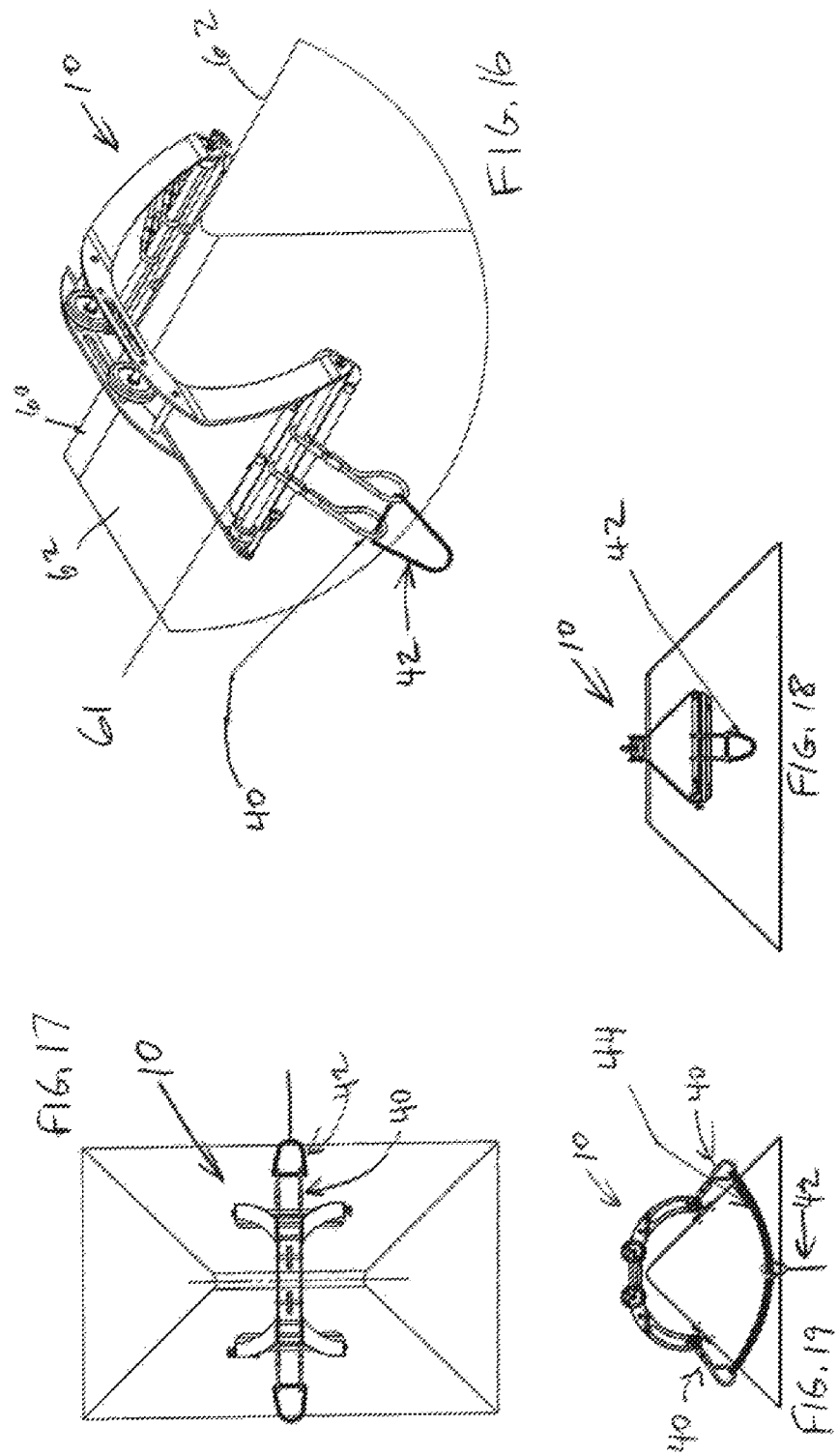

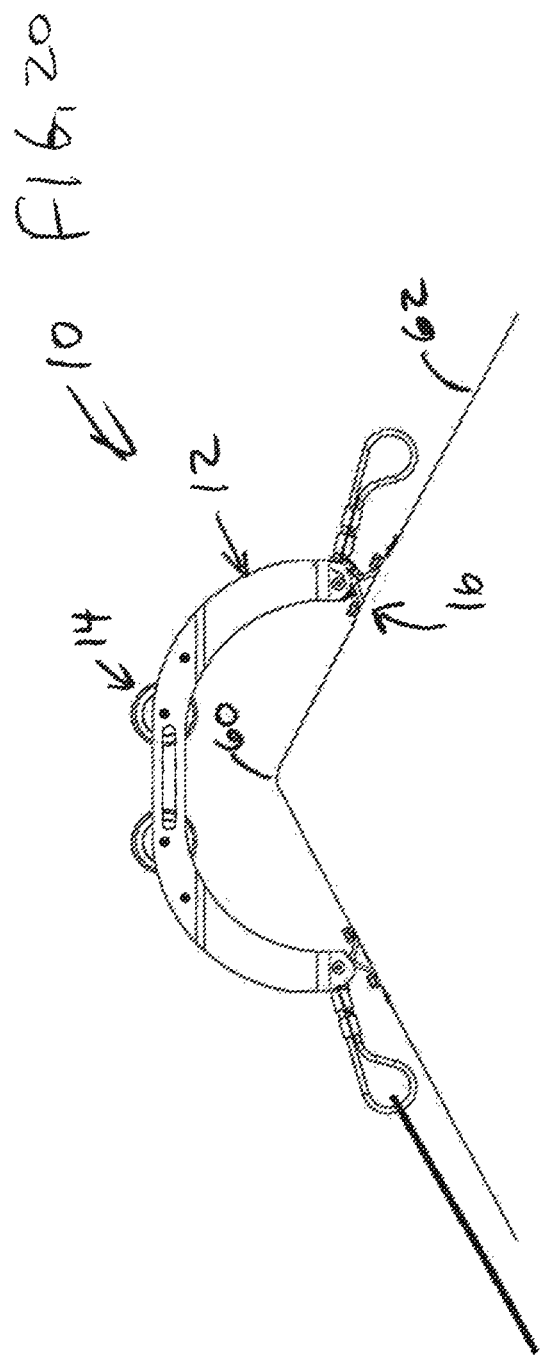

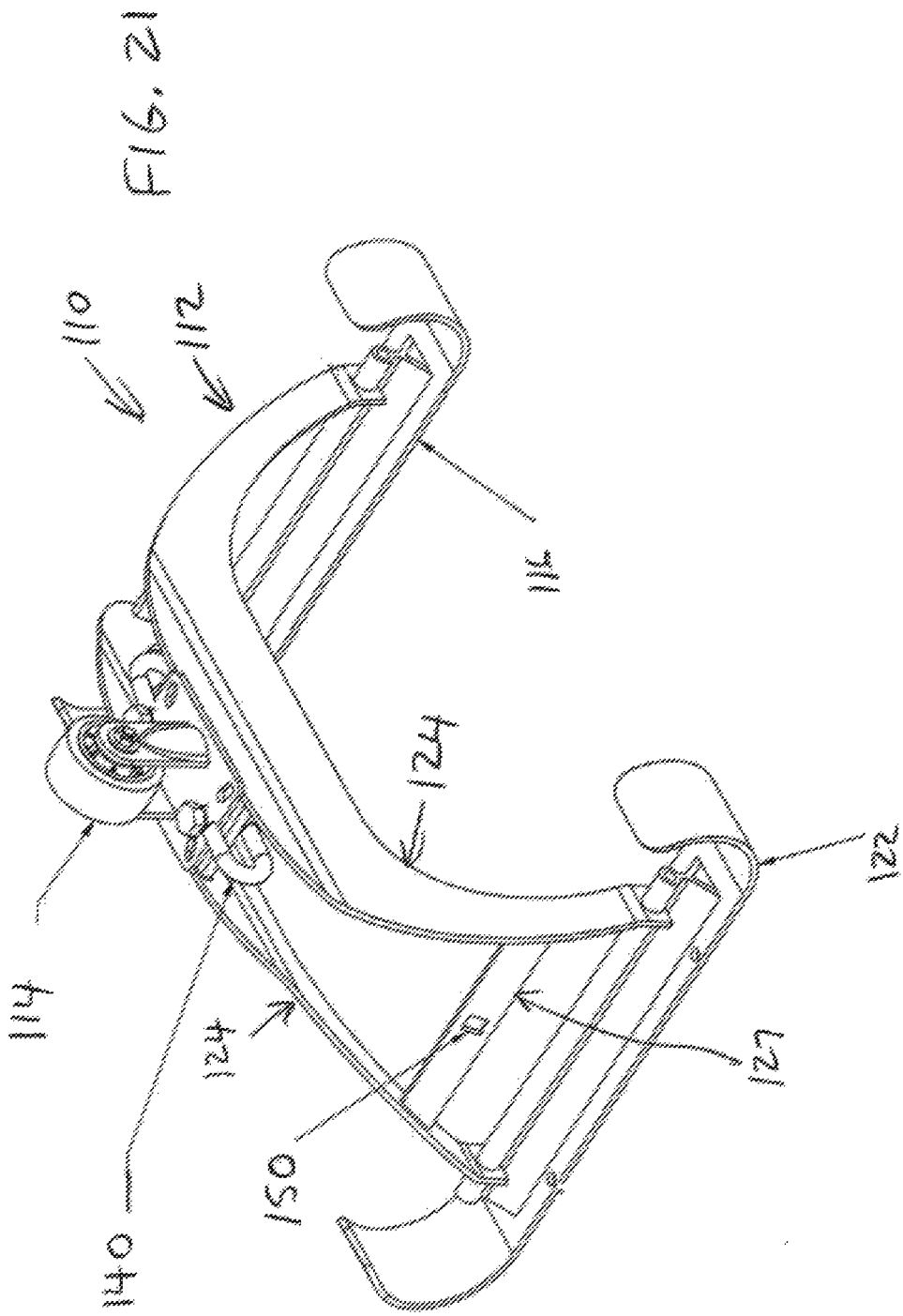

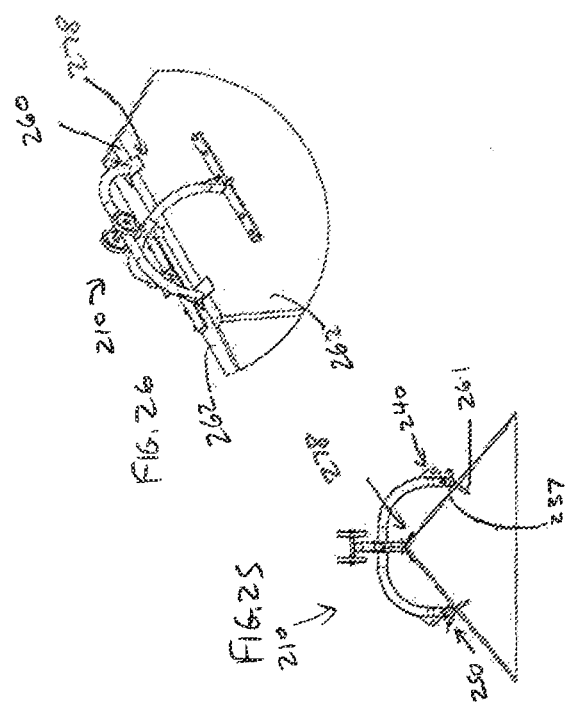

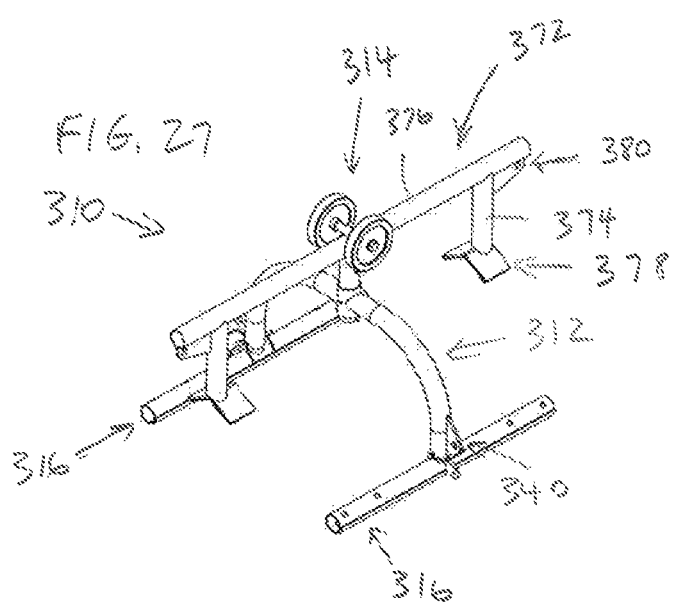

ROOF-MOUNTED FALL-ARREST SAFETY DEVICE

CROSS-REFERENCE TO RELATED APPLICATION

This application claims the priority benefit of U.S. Provisional Patent Application Ser. No. 62/305,124, filed Mar. 8, 2016, which is hereby incorporated herein by reference.

TECHNICAL FIELD

The present invention relates generally to worker safety equipment, and particularly to safety equipment for protecting workers on roofs of building structures from injuries from falling.

BACKGROUND

It's common for roofs of building structures to need to be accessed by persons for a variety of reasons. For example, workers often need to access roofs of residential buildings (homes, garages, etc.), commercial buildings, pavilions, etc. to install, remove, and/or replace roofing tiles, vents and flashings (for furnaces, hot water heaters, attic hot air, ovens, fireplaces, etc.), satellite TV dishes, gutters, etc., or even for inspection purposes. Because of the height and steep pitch of many roofs, climbing up on them is inherently hazardous. To address this problem, there have been developed safety devices that hook onto the ridge of roofs and tether/harness systems that attach to and suspend from these hooking devices. While these ridge-hooking and tether-suspension systems are of some beneficial use, they remain limited and in need of improvement to provide enhanced ease of use and user safety.

Accordingly, it can be seen that needs exist for improvements in safety systems for workers and other persons accessing roofs of buildings and other structures. It is to the provision of solutions to this and other problems that the present invention is primarily directed.

SUMMARY

Generally described, the present invention relates to a roof-mounted fall-arrest safety device that securely mounts in place on a roof peak (e.g., ridge or point) and that enables workers to couple their safety tethers to the secured device so that if they fall their fall will be arrested for safety. In typical embodiments, the safety device includes a frame, one or more rotationally attached wheels, two or more end/joist feet attached to opposite ends of the frame, one or more end safety tether attachments, and a flip-pole attachment. The frame straddles the roof peak so that the feet are stably positioned on the opposite roof surfaces. The wheels enable the device, when flipped to its inverted position, to be rolled up the roof for installation and back down after use. The flip-pole attachment enables attachment of a flip pole to the device for use in installing and removing the device from a ladder. And the end safety tether attachments enable workers to couple their safety tethers to the secured device at either of its ends so that if they fall their fall will be arrested for safety. In various embodiments, the feet are pivotal to adjust for different roof pitches and/or an outrigger assembly is included with a transverse frame with peak-mounting feet for nesting on the roof peak, with side tether attachments for side attachment, with optional vertical repositioning of the outrigger assembly for different roof pitches, and/or with optional lateral reconfiguring of the outrigger assembly from a use configuration to a compact aligned configuration for installation/removal and storage/transport.

The specific techniques and structures employed to improve over the drawbacks of the prior devices and accomplish the advantages described herein will become apparent from the following detailed description of example embodiments and the appended drawings and claims.

BRIEF DESCRIPTION OF DRAWINGS

FIG. 1 is a perspective view of a roof-mounted fall-arrest safety device according to a first example embodiment of the present invention, showing a frame, wheels, feet, and attachments for a flip pole and safety tethers.

FIG. 2 is an opposite perspective view of the safety device of FIG. 1.

FIG. 3 is a detail view of a portion of the safety device of FIG. 2.

FIG. 4 is an end view of the safety device of FIG. 2.

FIG. 9 is a perspective view of a lock collar of the safety device of FIG. 1.

FIG. 10 is a detail side view of a lock system of the safety device of FIG. 1, shown locked in a first pitch position for the pivotal feet.

FIG. 11 is a detail end view of the lock system of the safety device of FIG. 10.

FIG. 12 shows the lock system of the safety device of FIG. 10 locked in a second pitch position for the pivotal feet.

FIG. 13 is a detail end view of the lock system of the safety device of FIG. 12.

FIG. 14 is a side view of the safety device of FIG. 1 being installed on a roof.

FIG. 15 shows the roof-installed position of the safety device of FIG. 14, with the roof having a first pitch.

FIG. 16 is a perspective view of the roof-installed position of the safety device of FIG. 15.

FIG. 17 is a top view of the roof-installed position of the safety device of FIG. 15.

FIG. 18 is an end view of the roof-installed position of the safety device of FIG. 15.

FIG. 19 shows the roof-installed position of the safety device of FIG. 15 with a link cord for side attachment of safety tethers.

FIG. 20 shows the roof-installed position of the safety device of FIG. 14, except on a roof having a second pitch.

FIG. 21 is a perspective view of a roof-mounted fall-arrest safety device according to a second example embodiment of the present invention, showing a frame, a wheel, feet, and attachments for a flip pole and safety tethers.

FIG. 24 is a side view of the safety device of FIG. 23 being installed on a roof.

FIG. 25 is a side view of the roof-installed position of the safety device of FIG. 24.

FIG. 26 is a perspective view of the roof-installed position of the safety device of FIG. 25.

FIG. 27 is a perspective view of a roof-mounted fall-arrest safety device according to a fourth example embodiment of the present invention, showing a frame with end feet, a transverse outrigger with side feet, wheels, and attachments for a flip pole and safety tethers.

DETAILED DESCRIPTION OF EXAMPLE EMBODIMENTS

Figure 6:
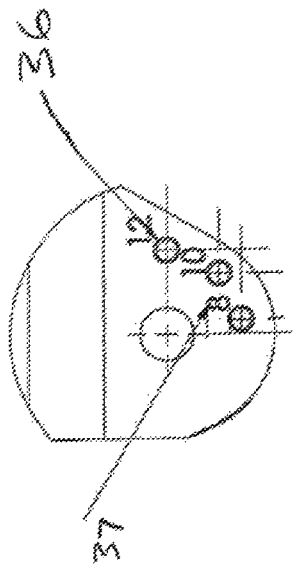
FIG. 6 is a detail view of a portion of the safety device of FIG. 5.
Figure 5:
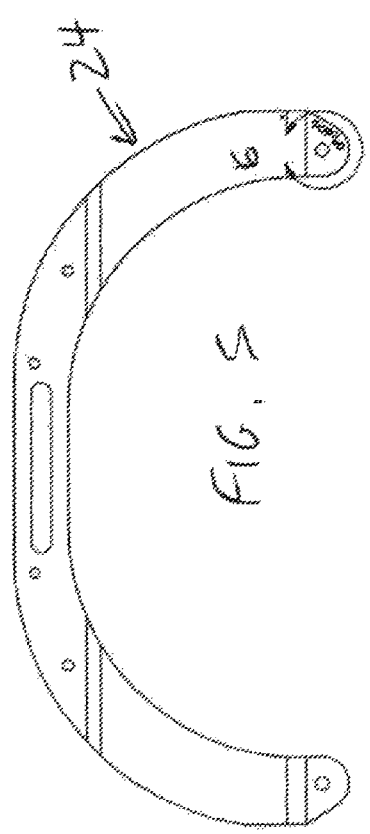
FIG. 5 is a side view of a frame member, before configuration for final assembly, of the safety device of FIG. 1.
Figure 7:
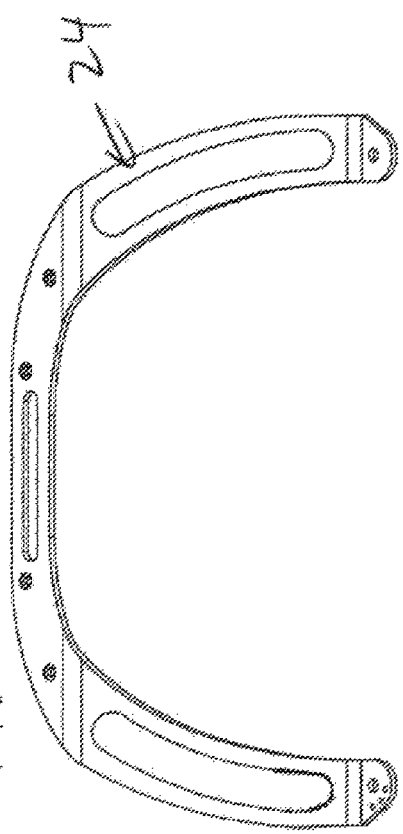
FIG. 7 is an end view of the frame member, configured for final assembly, of FIG. 5.
Figure 8:
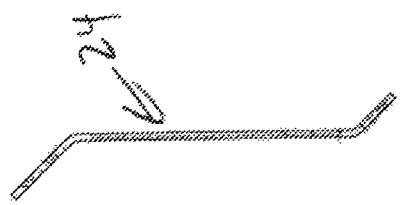
FIG. 8 is a side view of the frame member of FIG. 7.

The present invention relates to safety devices that are designed for mounting over and to a building-structure roof peak and for use by a worker or other person accessing the roof to arrest (prevent or limit) a fall from a height when on or adjacent the roof. The safety devices can be used on a conventional gable, saddle, or hip roof, as shown herein, or on other roof types having a peak (e.g., a ridge or point) with two opposite roof surfaces (e.g., a gambrel, mansard, pyramid, or gazebo roof), and others. In addition, the safety devices can be used on any roofing surface including composition roofing, metal roofing, wood shakes, tile roofing, or even plain plywood decking during the roof-installation process. Furthermore, the safety devices are for use on a roof of a roofed structure, which includes residential, commercial, and industrial buildings, sheds, garages, and other storage facilities, pavilions and other roof-covered areas, and other structures with roof coverings.

The safety devices are of a portable, ridge-hooking, and roof-anchored type that can be mounted onto/over the peak (ridge or point) of a roof, for support by both opposite roof surfaces, and installed and removed from a ladder leaning against the building structure. Conventional safety tethers (e.g., ropes) can be attached to the safety devices and to users (e.g., wearing conventional safety harnesses or belts) so that, while attached to the tether, there is a safe way to access the roof from the ladder, move about the roof, and access the ladder from the roof. By using the safety devices, a roof can be safely accessed to inspect it, to replace or install roofing material, and/or for other purposes, even when the roof has a steep pitch. The safety devices can be installed and removed by using one or more flip poles of a conventional type known in the art. Because the flip poles, tethers, and safety harnesses/belts that the safety devices are used with can all be of conventional types well-known in the art and commercially available from numerous well-known sources, for the benefit of brevity they will not be detailed herein.

FIGS. 1-20 show a roof-mounted fall-arrest safety device 10 according to a first example embodiment of the present invention. The safety device 10 includes a frame 12, one or more wheels 14 rotationally attached to the frame, two or more feet 16 attached to opposite ends of the frame, one or more safety tether attachments 40, and a flip-pole attachment 50.

Referring particularly to FIGS. 1-13, the frame 12 is generally inverted U-shaped (when viewed from a side, see FIG. 8), with two opposite-end lower leg portions 18 and an upper intermediate portion 20 extending between them, with a transverse opening extending side-to-side through the frame and formed between the opposite leg portions of the frame, and with the lower ends portions defining opposite ends of the frame. The upper intermediate portion 20 of the frame 12 is typically relatively narrow (when viewed from an end, see FIG. 4) to facilitate ease of flipping the safety device 10 between upright use and inverted installation positions. And the lower leg portions 18 and/or the feet 16 of the frame 12 are typically relatively wide (when viewed from an end, see FIG. 4) to provide a wider (relative to conventional roof-safety devices) footprint/stance for enhanced stability in the upright use position. In some embodiments such as that depicted, the frame leg portions 18 and the frame feet 16 have curved sides 22 (when viewed from an end, see FIG. 4) to facilitate ease of flipping the safety device 10 between upright use and inverted installation positions.

The frame 12 is rigid and made of one or more structural members made of a material such as aluminum, steel, and/or another metal selected for strength and light weight. In the depicted embodiment, for example, the frame 12 includes two side members 24, each with an upper intermediate portion and outwardly flared lower-end leg portions, the upper intermediate portions relatively narrowly spaced and the lower-end leg portions relatively widely spaced, and fixed together by upper connecting members 26 and lower connecting members 28. As a representative example, the width of the safety device 10 (between the right and left legs of the frame) can be about 67% greater than its height, and its depth (between the front and back legs of the frame) can be about 134% greater than its height. The upper and lower connecting members 26 and 28 can be provided by rods, bars, brackets, or other conventional structural members. In other embodiments, the frame includes one central member and T-shaped feet at its opposite ends, one central member and triangular-shaped feet at its opposite ends, or other frame configurations for providing the functionality described herein.

As noted above, the frame 12 is generally inverted U-shaped (including for example inverted "V" and "Y" shapes) with a transverse opening extending side-to-side through the frame and formed between the opposite lower end portions 18 of the frame (see FIG. 15). In this way, the frame 12 can be "hooked" over a peak (i.e., a ridge, cap, or point) of a roof, with the roof peak received within the transverse opening of the frame, and with the feet 16 on opposite ends of the frame resting on the opposite roof surfaces. In typical embodiments, the frame 12 is thus symmetrical when viewed from the side (see FIG. 15), so that the safety device 10 can be installed with either or both ends being used as an attachment location for a safety tether. In addition, the frame 12 has fixed dimensions end-to-end to form a fixed span and thus a fixed transverse opening; in other words, the frame is not adjustable to increase the size of the transverse opening by increasing the spacing apart (end to end) of the feet 16.

The wheels 14 can be of a conventional type such as those used on other roof-ridge anchoring devices. For example, the wheels 14 can be provided by casters or rollers with 4-inch rubber or plastic wheels selected for use on tile, slate, and other conventional roof surfaces, so as to not damage the roof when the safety device 10 is inverted and rolled up or down the roof. Also, two wheels 14 can be provided with spaced apart axes to allow greater clearance (relative to one center-positioned wheel) from the roof ridge or point when the safety device 10 is installed in the upright use position. In other embodiments, the wheels can be provided in larger or smaller sizes, greater or smaller numbers, and/or other materials.

To provide for use of the safety device 10 on roofs with different pitches, the feet 16 of this embodiment are pivotal relative to the frame 12. A conventional pivotal coupling can be provided for mounting each of the feet 16 to the frame 12 to permit the feet to pivot. For example, the lower connecting members 28 of the frame 12 can be rotationally mounted to the two side frame members 24 by shoulder bolts 30, and the pivotal feet 16 can extend from the rotational lower connecting members, as depicted. To provide a relatively large surface area for contacting and frictionally gripping the roof, the feet 16 can be elongated and extend the entire transverse width of the lower end/leg portions 18 of the frame 12 (e.g., between the two frame members 24 at their lower ends), as depicted. Also, mounting holes 17 can be formed in the feet 16 for installing fasteners (e.g., screws or nails) 61 through them and into aligned underlying roof joists (including rafters, trusses, etc.) to secure the safety device 10 in place on the roof for use. In addition, each of the feet 16 can include a center pivot/mount and two oppositely extending contact surfaces in the shape of an inverted "V," as depicted in FIG. 6. In other embodiments, each end of the frame can have two or more independently pivotal feet.

A lock system 32 is provided to selectively secure the feet 16 in a variety of different positions each pivoted at a different angle relative to the frame 12. With particular reference to FIGS. 3, 5-6, and 8-13, for example, the lock system 32 can include, for each foot 16 on each end of the device 10, a pin 34 that can be selectively inserted into any one of a series of openings 36 arranged in an arc/curve in the respective frame end/leg portion 18 and into an aligned (with the selected frame opening) opening 40 in a collar 38 that rotates with (e.g., is fixedly attached to) the respective foot 16. Indicia 37 can be provided on the frame (e.g., by etching, engraving, or otherwise marking) adjacent each of the openings 36 to identify the corresponding roof pitch/angle that the foot 16 is in when the pin 34 is in that opening and the collar opening 40.

In use, with the foot 16 locked/fixed in a first angular position, the pin 34 can be retracted from engagement with the collar opening 40 and the frame opening 36 for that first angular position, then the foot 16 (and the attached collar 38) can be pivoted/rotated to a second angular position (at an angle from the first position) with the collar opening 40 aligned with a different one of the frame openings for that second angular position, and the pin inserted into them to lock the foot in that fixed position. In the depicted embodiment, the pin 34 is T-shaped (for ease of manually gripping and manipulating) and tethered to the frame 12, and the openings 36 are through-holes in the frame. The arrangement of the frame openings 36 can include offset, radial geometry to assure proper alignment of the selected foot angle.

It will be understood that the depicted and described lock system 32 is representative for illustrative purposes, and is not limiting of the invention, as numerous other lock mechanisms are contemplated by the invention and include for example gear-sets, ratchets, toothed hubs, other pin-and-hole systems, spring-biased pin-and-hole systems, toothed hubs, gear-sets, ratchets, and the like. For example, in another embodiment the lock system includes a spring-biased pin that is biased by the spring (e.g., a tension spring between the frame and the pin) toward engagement with the collar opening and (when in alignment) any of the frame openings, that is moved (e.g., pulled or pushed) against the spring force to retract it from receiving locked engagement with selected frame and collar openings, that is released to move under the discharging spring force into locking engagement with selected aligned frame and collar openings. In some embodiments, there is only one opening in the collar, and in other embodiments (e.g., as depicted) there are a series of collar openings with different radial spacings from the rotational axis of the collar because the roof pitches are very close to one another.

As noted above, the safety device 10 includes attachments 40 for at least one and typically a plurality of safety tethers to be connected to and suspended from. As depicted, the tether attachments 40 can be in the form of one or more safety cables 40 that can be attached to any or all of the lower connecting members (e.g., in the form of rods or bars) 28 extending across the transverse width of each of the lower end portions 18 and to which a worker's safety tether can be attached. Two of the safety cables/tether attachments 40 can be provided for connecting a single tether in order to distribute load forces and act as a redundant safety feature in case one of the safety cables were to fail. The safety cables 40 can include conventional climber carabiners or other conventional couplings for attachment by the safety tether.

In other embodiments, more or fewer of the safety cables can be provided, they can be attached to another part of the safety device (e.g., another part of the frame 12), and/or other types of conventional attachments (eyebolts, hooks, holes in the frame, bands, and/or the like) can be provided. And in still other embodiments, the attachments are provided by the lower connecting members 28 extending across the transverse width of each of the lower end portions 18, with these members themselves functioning as the attachments by providing locations for directly attaching user-provided carabiners or other couplings of user-provided safety tethers.

In any event, at least one of the tether attachments 40 is provided at each end of the safety device 10 in typical embodiments. For example, because each lower end/leg portion 18 of the frame 12 includes one of the lower connecting members 28 and/or cables 40, each end of the frame can be used to attach a tether to it, and if desired two tethers can be attached to the opposite ends of the safety device 10 (though preferably not for use at the same time by two users). In fact, because of the symmetrical shape and wider end/leg portions 18 of the frame 12, and the elongate feet 16 on each end of the frame, a user can attach a tether to the safety device 10 and, instead of suspending down from an end (front or back) of the safety device, optionally suspend transversely down a side (left or right) of the safety device.

As further noted above, the safety device 10 of this embodiment can be installed and removed by using a conventional flip pole 52 and include an attachment 50 for the flip pole. The flip-pole attachment 50 can be in the form of a portion of the frame (e.g., a bracket, plate, or other integral portion or attached member, adjacent one of the upper connecting members 26 on either end of the frame 12) having an opening (e.g., through-hole or other receptacle) that receives an end of the flip pole 52. And the flip-pole attachment 50 can include a securement such as a pin that can be received into two aligned openings in the corresponding frame portion and the flip pole 52 to secure the flip pole to the safety device 10 for use so they can be moved together translationally and rotationally. Other securements can alternatively be provided, for example the attachment receptacle and the flip-pole end can have mating screw threads. In this way, the flip pole 52 can be quickly and easily attached to and detached from the safety device without needing any tools. A single flip pole 52 can be used when the roof ridge or point is close enough to the worker (e.g., on a ladder at an edge of the roof) to reach, and if not then a series of the poles can be attached together end-to-end to provide the needed length.

In addition, the frame 12 can include a hook 54 that receives and holds the flip pole 52 when not in use for installing or removing the safety device 10. For example, the hook 52 can be rotationally mounted to the frame 12 so that it can swing through 360 degrees for variable orientation and positioning of the access opening of the hook. Thus, after the flip pole 52 has been detached from the flip-pole attachment 50 of the safety device 10, it can be securely hung in the hook 54 and rested upon the roof or gutter while not in use. In other embodiments, the hook is included on the flip pole itself and used for hooking onto the safety device, roof peak, gutter, etc.

Referring particularly to FIGS. 14-20, a method of installation of the safety device 10 will now be described. As a preliminary step, the feet 16 are adjustably set and locked, by using the lock system 32, at the desired angular position based on the pitch of the particular roof the safety device 10 is to be mounted to. Next, standing on a ladder positioned for accessing the roof, a user attaches his or her safety tether (e.g., a rope with carabiner) 42 to the pair of safety cable attachments 40 of the safety device 10. Then a flip pole 52 is connected to the flip-pole attachment 50 of the safety device 10, the safety device 10 is inverted into its inverted installation position resting on its wheels 14, and the safety device is pushed up the inclined roof surface 62 by extending the flip pole 52 up the roof (FIG. 14). Then the safety device 10 is rolled over onto the roof peak (e.g., ridge or point) 60 by twisting the flip pole 52 (FIG. 15). Then the user can ascend up the roof surface 62 to the roof peak 60, manually taking up slack in the safety tether 42 during the ascent. If desired, the safety device 10 can be anchored to the roof surfaces 62 for example by inserting lag screws 61 or other fasteners through the mounting holes 37 in the feet 16 and into aligned roof joists (for better securing the safety device in place, especially so a user can attach a tether to the safety device and suspend transversely down a side (left or right) of the safety device). The flip pole 52 is then removed (as desired) from the flip-pole attachment 50, and can be hung by the hook 54 of the safety device 10 or onto the roof ridge or gutter by a hook of the flip pole, as desired.

Removal of the safety device 10 is essentially the reverse operation of the installation. Thus, removal of the safety device 10 includes removing any feet-mounting screws, reattaching the flip pole 52, repositioning it to the inverted position, rolling it down the roof, and detaching the safety tether.

As noted above, the safety device 10 can be mounted over a roof peak (FIG. 16) and attached to by a safety tether 42 at either or both front and back ends for suspending down a front or back end of the safety device for example in alignment with the intermediate frame member (FIGS. 17-18). Alternatively or additionally, the safety device 10 be provided with a link cord (e.g., a rope, cable, chain) 44 that can be connected to and between the opposite ends of the frame 12 (for example connected to and between two of the opposite-end safety cable attachments 40), and the link cord can be attached to by a safety tether 42 for suspending down a transverse left or right side of the frame (FIG. 19).

The pivotal attachment of the feet 16 to the frame 12, combined with the lock system 32, enable the feet to be adjusted to and locked at an angular position so that their contact surfaces rest flush against the two roof surfaces 62 divided by the roof peak 60. For example, the feet 16 can be set at a relatively steep angular position (e.g., about 45 degrees from horizontal) so that they rest flush against the relatively steep roof surfaces 62 of a 12×12 roof, as shown in FIG. 15. And the feet 16 can be reset at a relatively shallow angular position (e.g., less than about 45 degrees from horizontal) so that they rest flush against the relatively shallow roof surfaces 62 of an 8×12 roof, as shown in FIG. 20.

FIG. 21 shows a roof-mounted fall-arrest safety device 110 according to a second example embodiment of the present invention. The safety device 110 is similar to that of the first embodiment, for example, it includes an inverted U-shaped frame 112 with two opposite ends and a peak-receiving/straddling transverse opening, one or more wheels 114 rotationally attached to the frame, pivotal feet 116 that are pivotally attached to the frame opposite ends, at least one safety tether attachment 140, and a flip-pole attachment 150.

However, in this embodiment the feet 116 are in the form of skids with flat bottom surfaces across their widths (for a good-sized surface area for contacting and gripping the roof) and with curved-up ends 122 (to facilitate flipping over sideways). There is a single center-mounted wheel 114. The tether attachments 140 are provided by D-rings mounted to the frame 112. And the flip-pole attachment 150 is provided by a non-circular hole (e.g., square or splined) in the frame 212 (e.g., in a connecting member 127 extending side-to-side between side frame members 124).

FIGS. 22-26 show a roof-mounted fall-arrest safety device 210 according to a third example embodiment of the present invention. The safety device 210 is similar to that of the first embodiment, for example, it includes an inverted U-shaped frame 212 with two opposite ends and a peak-receiving/straddling transverse opening, one or more wheels 214 rotationally attached to the frame, feet 216 that are attached to the frame opposite ends, at least one end tether attachment 240, and a flip-pole attachment 250.

However, in this embodiment the main/joist frame 212 is in the form of a single inverted U-shaped member (e.g., metal tubing). There are two coaxial wheels 214 for end-to-end stability of the safety device 210, which can be mounted on the main frame or on an outrigger assembly (as depicted and described below). The end tether attachments 240 are provided by apertured tabs extending from the frame 212, with the apertures each sized and shaped for receiving a carabiner or other conventional coupling of a safety tether. And the flip-pole attachment 250 is provided by an apertured tab, with the tab sized and shaped for being received into a hollow end of a flip pole 252 and with the aperture sized and shaped for receiving a pin inserted through an aligned hole in the flip pole.

In addition, the end feet 216 are each in the form of a transverse member with a generally curved bottom portion so that they contact roof surfaces with two different pitches at two different points on their curved feet bottoms, without the feet pivoting. For example, the end feet 216 can be provided by generally cylindrical metal tubing. So for a shallower-pitched roof, the contact points of the curved bottoms of the end feet 216 and the roof surfaces 260 are the about 5 o'clock and 7 o'clock positions (e.g., for the respective left and right shown frame end portions of FIG. 25), and for a steeper-pitched roof the contact points are more inward and higher at the about 4 o'clock and 8 o'clock positions. Of course, when resting on a flat surface, the contact points would be at the about 6 o'clock positions for both feet. In some embodiments, the curved bottom portions of the feet each include multiple flattened areas along their lengths, with each opposite pair (one on each foot) of flattened areas corresponding to a different pitch of the roof (and thus oriented relative to longitudinal axes of the feet at different opposite angles) so that they lie flush on the opposite roof surfaces for roofs of the corresponding pitch. As such, the generally cylindrical feet can be slightly polygonal in cross section.

Each of the end feet 216 typically has a gripping, abrasion-resistant, bottom-covering pad 217 (e.g., a rubberized sheet or coating for increased gripping of the roof surface). Each of the end feet 216 can also each include an upright center-positioned member (so that with the transverse foot member they form a "T" shape) that is telescopically arranged relative to the respective end of the frame 212, with alignable holes in the foot upright member and the frame ends and with a pin that can be received in the aligned holes. In this way, the pins can be removed and the end feet 216 detached from the frame 212 to provide a compact arrangement for storage and/or transport of the safety device 210.

Furthermore, two of the mounting holes 219 of the end feet 216 can be spaced apart by 12 inches for inserting lag screws 261 or other fasteners through them and into roof joists (including rafters, trusses, etc.) at a 12-inch spacing, and two of the mounting holes of the same end foot can be spaced at 16 inches for roofs with a 16-inch joist spacing. In the depicted four-holed embodiment, the two end-most mounting holes 219 are at the 16-inch spacing and the two inner-most holes are at the 12-inch spacing. In other embodiments, other spacings can be provided and/or one of the holes can be used for two different spacings (e.g., with one hole positioned on one end of the end foot and two holes on the other end).

Moreover, the safety device 210 of this embodiment includes a transverse outrigger assembly 270. The outrigger assembly 270 includes a transverse frame member 272 that is transverse (e.g., generally perpendicular) to the main frame 212. In typical embodiments, the outrigger frame member 272 is made of aluminum or other metal tubing, though other conventional materials and frame construction can be used. The outrigger frame member 272 is typically generally U-shaped (e.g., similarly to the main frame 212), with two opposite side/leg portions 274 defining outrigger frame sides and an intermediate portion 276 between them.

The outrigger assembly 270 further includes at least one side foot 278 for resting on and being supported by the roof peak (e.g., ridge line), with typically there being two side/peak feet with one at each of the ends of the side/leg portions 274. To seat stably on the roof peak, the side/peak feet 278 can each be provided by an angle bracket forming a wedge-shaped opening configured so that, with a dividing joint line between two bracket plates aligned with the roof ridgeline 260, the wedge-shaped side feet straddle, receive, and nest on the roof ridgeline, while the main end feet 216 are resting on the two opposite roof surfaces 262. In other embodiments, the peak side feet can have other forms such as two opposite pads mounted to the side/leg portions by connecting rods, as long as the feet each straddle the roof ridgeline and at least partially rest on the opposite roof surfaces. In other embodiments, the peak feet have the same or similar design and construction as the end feet described and shown herein.

In addition, the outrigger assembly 270 includes one or more side tether attachments 280 for at least one and typically a plurality of safety tethers to be connected to and suspended from. As depicted, the side safety tether attachments 280 are provided by apertured tabs extending from the outrigger frame 272, with the apertures each sized and shaped for receiving a carabiner or other conventional coupling of a safety tether. In other embodiments, the safety tether attachments have the same or similar design and construction as the other safety tether attachments described and shown herein. In this way, the safety tethers for workers can be attached on both ends of the safety device 210 at end tether attachments 240 and/or on both sides of the device at side tether attachments 280. This enables workers to be suspended in any direction (a full 360 degree range) from the safety device 210 without having to detach, reposition, and remount the device in place.

Furthermore, the opposite side/leg portions 274 of the outrigger frame 272 extend transversely relative to the main frame 212, with the transverse outrigger frame member 272 and the main frame 212 typically mounted together at their intermediate portions 220 and 276. For example, the outrigger frame 272 can be mounted to the main frame 212 by a connector member 282. In the depicted embodiment, the connector member 282 extends generally vertically between the two parts.

Also, the connector member 282 can be slidably mounted between the outrigger frame 272 and the main frame 212 for adjusting the vertical position of the outrigger assembly 270 above the main frame 212 as needed to maintain roof contact of all the feet 216 and 278 for different roof pitches. For example, the connector member 282 can be fixedly attached to the outrigger frame 272 and telescopically received in a sleeve (or other receiving member) 284 of the main frame 212. Also, an outrigger lock system can be provided to secure the outrigger frame 272 in the selected position relative to the main frame 212. For example, the lock system can include a pin 286 that is removably insertable into a hole 287 in the sleeve 284 and any aligned one of a series of holes 288 in the connector 282 to provided the desired vertical position of the outrigger frame 272 and side/peak feet 278, as depicted.

Figure 23:
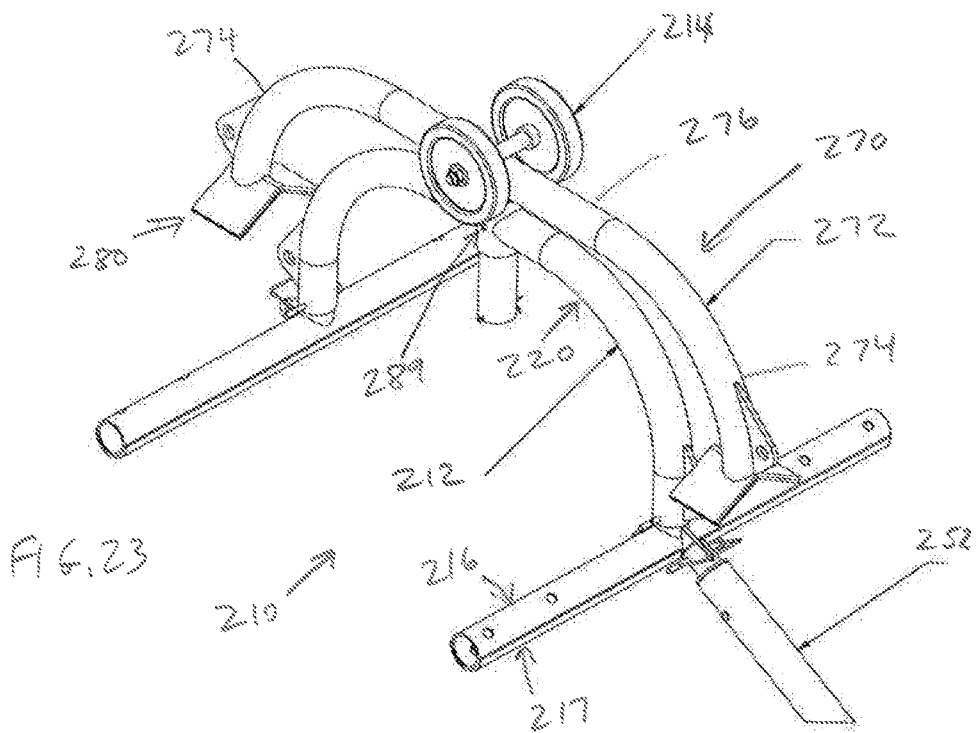
FIG. 23 is an opposite perspective view of the safety device of FIG. 22 shown with the outrigger repositioned to a storage/transport configuration.
Figure 22:
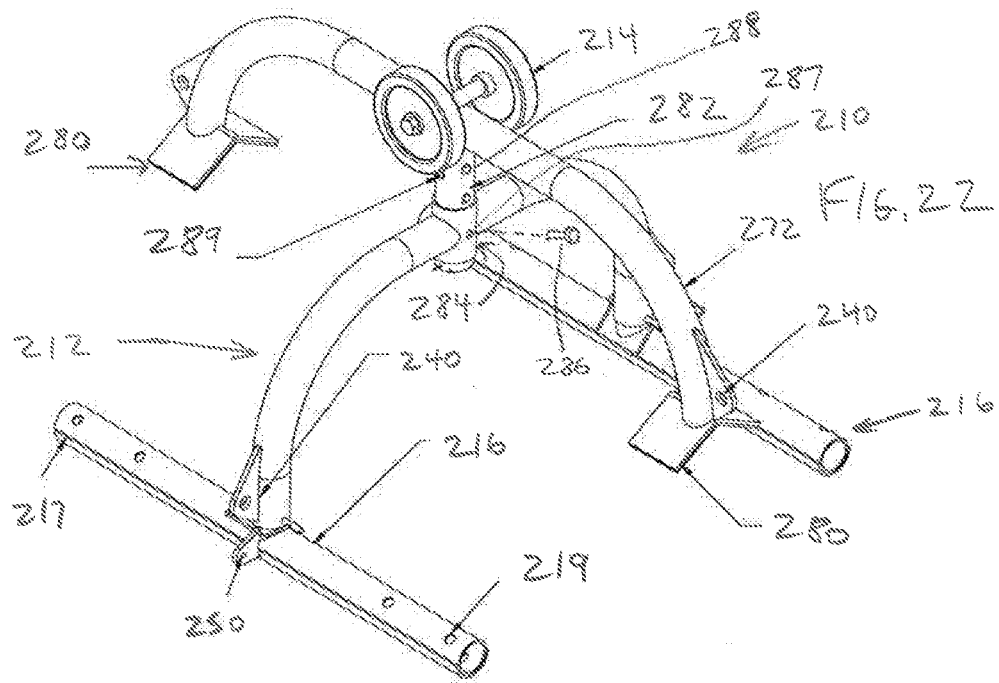
FIG. 22 is a perspective view of a roof-mounted fall-arrest safety device according to a third example embodiment of the present invention, showing a frame, wheels, end feet, a transverse outrigger with side feet, and attachments for a flip pole and safety tethers, and showing the device in a use configuration.

Further, the connector member 282 can be adjustably (e.g., rotationally) mounted between the outrigger frame 272 and the main frame 212 for adjusting the outrigger frame between a use configuration generally transverse to the main frame (FIG. 22) and a generally aligned configuration generally parallel to the main frame for installation/removal and for storage/transport (FIG. 23). The lock system can further provide for securing the outrigger frame 272 in the storage/transport configuration, for example a spring-biased pin 289 of one of the parts (e.g., the depicted connector 282) can be retractably receivable in a hole of the other part (e.g., the depicted sleeve hole 287). In other embodiments, other conventional locking elements known in the art can be provided. The wheels 214 can be mounted to and rotate with outrigger frame 272, as depicted.

Providing the ability to move the outrigger frame 272 to the aligned position is beneficial, in part because it enables the safety device 210 to be more easily rolled up and down the roof, but also because it enables the device to be flipped over between inverted and use positions by using the attached flip pole. In other embodiments, the outrigger frame includes two outrigger frame members that are each foldably mounted to the main frame for folding deployment to the use configuration, two outrigger frame members that are telescopically arranged together for telescopic extension/deployment to the use configuration, or other configurations to provide the functionality described herein for deployment of the outrigger assembly from a compact configuration that enables easily flipping the safety device over, without outrigger-roof interference, to the use configuration. In such embodiments, the outrigger frame can be positioned at the same vertical position as, or below, the main frame, and thus need not have an inverted U-shape with downwardly extending legs. Also, some embodiments can be provided in which the outrigger frame is fixedly mounted in the use position to the main frame and thus does not rotate to the aligned position for installation/removal and storage/between.

Referring particularly to FIGS. 24-26, a method of installation of the safety device 210 will now be described. This method is substantially similar to that previously described, except for use of the outrigger assembly 270, so to avoid redundancy it will be only briefly described.

No foot adjustment is needed for this embodiment, but if adjustable feet are included than first they are positioned for the roof pitch. Next, a worker's safety tether is connected to one of the safety tether attachments 240. Then a flip pole 252 is connected to the flip-pole attachment 250, the safety device 210 is inverted into its inverted installation position resting on its wheels 214, and the safety device is pushed up the inclined roof surface 262 by extending the flip pole 252 up the roof (FIG. 24). Then the safety device 210 is rolled over onto the roof peak (e.g., ridgeline) 260 by twisting the flip pole 252 so that the device is in the use position straddling the roof peak 262 with its frame joist/end feet 216 on the opposite roof surfaces 260. The roof is climbed using the safety tether until the roof peak 262 and safety device 210 are reached. Then the outrigger 270 is unlocked and repositioned (e.g., rotated) to its use position with the outrigger peak/side feet 280 positioned on the roof ridgeline 260 (FIGS. 25-26). If desired, the safety device 210 can be anchored to the roof surfaces 262 for example by inserting lag screws 261 or other fasteners through the mounting holes 237 in the feet 216 and into aligned roof joists. The flip pole 252 is then removed from the flip-pole attachment 250 and additional workers can now tie-up to any of the other safety tether attachments 240. At this point, a worker can couple their safety tether to any of the four end or side tether attachments 240 or 280 to safely conduct whatever work needs to be done on the portion and slope of the roof.

FIG. 27 shows a roof-mounted fall-arrest safety device 310 according to a fourth example embodiment of the present invention. The safety device 310 is similar to that of the third embodiment, for example, it includes a main frame 312 with two opposite ends and a peak-receiving/straddling transverse opening, one or more rotationally mounted wheels 314, two end/joist feet 316 attached to the frame opposite ends, two end tether attachments 340, a flip-pole attachment 350, and a transverse outrigger frame 372 with two opposite sides, with two side/peak feet 378 attached to the outrigger opposite sides, and with two side tether attachments 380.

However, in this embodiment the inverted U-shaped outrigger frame 372 has an intermediate upper portion 376 that extends not just between but also outwardly/laterally beyond the lower leg portions 374. And two side tether attachments 380 are provided on each side at the respective junction of the intermediate upper portion 376 and the lower leg portion 374, and thus higher to provide a more vertical downward angle of force when the safety tether is attached.

It should be noted that any feature of any embodiment described herein can be included in any combination with any other feature or features of any other embodiment or embodiments described herein and/or with other feature(s) of other embodiment(s) not described herein.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A fall-arrest safety device for mounting onto a roof having a peak and two opposite surfaces and for attaching at least one safety tether of a worker, the safety device comprising:
   a generally U-shaped main frame having two lower end portions defining main frame opposite ends, an upper intermediate portion extending between the lower end portions, and a transverse opening extending side-to-side therethrough and formed between the two lower end portions;
   at least one wheel that rotates relative to the frame;
   at least two joist/end feet each one extending from a respective one of the frame lower end portions; and
   at least two end tether attachments each configured to permit the safety tether to be attached thereto for worker safety and positioned on the opposite ends of the main frame to permit the safety tether to be attached to either of the opposite ends of the main frame, wherein each one of the end tether attachments is formed by or extending from a respective one of the lower end portions of the main frame or the joist/end feet,
   wherein with the safety device in an inverted position the wheel contacts one of the two opposite roof surfaces so the safety device can be rolled up and down the wheel-contacted roof surface during installation and removal,
   wherein with the safety device in an upright use position the transverse opening receives and the main frame straddles the roof peak, with each one of the joist/end feet contacting and supported by a respective one of the roof surfaces, and with each one of the end tether attachments accessible for use on a respective one of the roof surfaces, and
   wherein the main frame is generally symmetrical in a side view, with the end tether attachments on the opposite ends of the generally symmetrical main frame, so that either of the opposite ends of the main frame can be used to attach the safety tether for worker safety and the worker can suspend down one of the ends of the main frame or suspend transversely down one of the sides of the main frame.

2. The safety device of claim 1, wherein the lower end portions of the frame are substantially wider than the upper intermediate portion of the frame to provide the frame with a wide footprint for stability during use and to facilitate flipping of the frame between the upright use position and the inverted position.

3. The safety device of claim 1, wherein the main frame has a fixed dimension end-to-end to form a fixed longitudinal span, wherein the transverse opening is thereby fixed and not longitudinally end-to-end adjustable, and wherein the two end tether attachments positioned on the two opposite ends of the main frame are fixed and not longitudinally end-to-end adjustable.

4. The safety device of claim 1, wherein the joist/end feet include a plurality of mounting openings for receiving fasteners for securing the safety device to the roof, wherein at least two of the mounting openings are spaced about 16 inches apart for securing to roof joists at 16-inch spacings.

5. The safety device of claim 4, wherein at least two of the mounting openings are spaced about 12 inches apart for securing to roof joists at 12-inch spacings.

6. The safety device of claim 1, wherein the joist/end feet have generally curved bottom portions so that for a first pitch of the roof surfaces they contact the roof surfaces at first points on their curved feet bottoms and for a second pitch of the roof surfaces they contact the roof surfaces at second points on their curved feet bottoms that are different from the first points.

7. The safety device of claim 1, wherein the joist/end feet are pivotally mounted to the lower end portions, wherein the pivotal feet are pivotally repositionable between a plurality of different angular positions for resting flush against the roof surfaces, and further comprising at least two locking mechanisms each one adapted to lock a respective one of the pivotal feet in the plurality of different angular positions to conform to a pitch of the roof surfaces to be installed upon.

8. The safety device of claim 1, further comprising a flip-pole attachment on the main frame to which a flip pole can be attached for installation and removal of the safety device.

9. A method of using the safety device of claim 1, comprising:
 while standing on a ladder positioned for accessing the roof;
  attaching the safety tether to one or more of the tether attachments,
  orienting the safety device in its inverted position with the wheel resting on the roof,
  pushing the safety device up the roof by pushing a flip pole connected to the safety device, and
  flipping over the safety device into the upright use position on the roof peak by twisting the flip pole,
 ascending the roof to the roof peak;
 for safety devices equipped with an outrigger assembly with peak/side feet, deploying the outrigger assembly to a use configuration that is transverse to the main frame with the peak/side feet positioned on the roof peak;
 for safety devices equipped with mounting openings in the joist/end feet, installing fasteners through the mounting openings into aligned roof joists; and
 proceeding with safely moving about the roof to perform work.

10. A fall-arrest safety device for mounting onto a roof having a peak and two opposite surfaces and for attaching at least one safety tether, the safety device comprising:
 a main frame having two lower end portions defining main frame opposite ends, an upper intermediate portion extending between the lower end portions, and a transverse opening extending side-to-side therethrough and formed between the two lower end portions;
 at least one wheel that rotates relative to the frame,
 at least two joist/end feet each one extending from a respective one of the frame lower end portions;
 at least two end tether attachments each configured to permit the safety tether to be attached thereto for worker safety and positioned on the opposite ends of the main frame to permit the safety tether to be attached to either of the opposite ends of the main frame; and
 a transverse outrigger assembly including an outrigger frame extending transversely to the main frame and defining outrigger frame sides, at least two peak/side feet positioned at the outrigger frame sides and configured for receiving the roof peak in an upright use position, and at least two side tether attachments positioned at the outrigger frame sides and configured for receiving the safety tether at the outrigger frame sides,
 wherein with the safety device in an inverted position the wheel contacts one of the two opposite roof surfaces so the safety device can be rolled up and down the wheel-contacted roof surface during installation and removal, and
 wherein with the safety device in the upright use position the transverse opening receives and the main frame straddles the roof peak, with each one of the joist/end feet contacting and supported by a respective one of the roof surfaces, and with each one of the end tether attachments accessible for use on a respective one of the roof surfaces.

11. The safety device of claim 10, wherein the outrigger frame includes two opposite lower leg portions defining the outrigger frame sides and an upper intermediate portion extending between the leg portions, wherein the peak/side feet are positioned on the outrigger frame lower leg portions, and wherein the side tether attachments are positioned on the outrigger frame lower leg portions.

12. The safety device of claim 10, wherein the outrigger frame is adjustably mounted to the main frame and moves between a use configuration generally transverse to the main frame and a generally aligned configuration generally parallel to the main frame for installation/removal and storage/transport.

13. The safety device of claim 10, wherein the outrigger frame is slidably mounted to the main frame to permit adjusting a vertical position of the outrigger assembly in a transverse use configuration relative to the main frame to provide roof contact of the peak/side feet and the joist/end feet for different roof pitches.

14. The safety device of claim 10, wherein the main frame is generally U-shaped and each one of the end tether attachments is formed by or extending from a respective one of the lower end portions of the main frame or of the joist/end feet.

15. The safety device of claim 10, wherein the transverse outrigger assembly further includes at least two side tether attachments positioned at the outrigger frame sides and configured for receiving the safety tether at the outrigger frame sides.

16. A fall-arrest safety device for mounting onto a roof having a peak and two opposite surfaces and for attaching at least one safety tether, the safety device comprising:
 a generally U-shaped main frame having two lower end portions defining main frame opposite ends, an upper intermediate portion extending between the lower end portions, and a transverse opening extending side-to-side therethrough and formed between the two lower end portions;
 at least one wheel that rotates relative to the frame;
 at least two joist/end feet each one extending from a respective one of the frame lower end portions, wherein the joist/end feet are elongated and extend transversely relative to the main frame;
 at least two end tether attachments each configured to permit the safety tether to be attached thereto for worker safety and positioned on the opposite ends of the main frame to permit the safety tether to be attached to either of the opposite ends of the main frame; and a transverse outrigger assembly including an outrigger frame extending transversely to the main frame and defining outrigger frame sides, at least two peak/side feet positioned at the outrigger frame sides and configured for receiving the roof peak in an upright use position, and at least two side tether attachments positioned at the outrigger frame sides and configured for receiving the safety tether at the outrigger frame sides, wherein with the safety device in an inverted position the wheel contacts one of the two opposite roof surfaces so the safety device can be rolled up and down the wheel-contacted roof surface during installation and removal, wherein with the safety device in the upright use position the transverse opening receives and the main frame straddles the roof peak, with each one of the joist/end feet contacting and supported by a respective one of the roof surfaces, with the peak/side feet receiving and supported by the roof peak, and with the end tether attachments and the side tether attachments accessible for use on all four ends and sides of the safety device for tether attachment without relocating the safety device, and wherein the outrigger frame is adjustably mounted to the main frame and moves between a use configuration generally transverse to the main frame and a generally aligned configuration generally parallel to the main frame for installation/removal and storage/transport.

17. The safety device of claim 16, wherein:
the joist/end feet are substantially wider than the upper intermediate portion of the frame to provide the safety device with a wide footprint for stability during use and to facilitate flipping of the main frame between the upright use position and the inverted position;

the main frame is generally symmetrical so that either of the frame ends can be used to attach a flip pole for installation and removal and to attach the safety tether for worker safety;

the main frame has fixed dimensions end-to-end to form a fixed span and so the transverse opening is not adjustable; and the main frame includes a flip-pole attachment to which a flip pole can be attached for installation and removal of the safety device.

18. The safety device of claim 16, wherein the joist/end feet include a plurality of mounting openings for receiving fasteners for securing the safety device to the roof, wherein at least two of the mounting openings are spaced about 16 inches apart for securing to roof joists at 16-inch spacings, and wherein at least two of the mounting openings are spaced about 12 inches apart for securing to roof joists at 12-inch spacings.

19. The safety device of claim 16, wherein the joist/end feet have generally curved bottom portions so that for a first pitch of the roof surfaces they contact the roof surfaces at first points on their curved feet bottoms and for a second pitch of the roof surfaces they contact the roof surfaces at second points on their curved feet bottoms different from the first points.

20. The safety device of claim 16, wherein the outrigger frame is slidably mounted to the main frame to permit adjusting a vertical position of the outrigger assembly in the transverse use configuration relative to the main frame to provide roof contact of the peak/side feet and the joist/end feet for different roof pitches.

* * * * *